Patented Aug. 2, 1927.

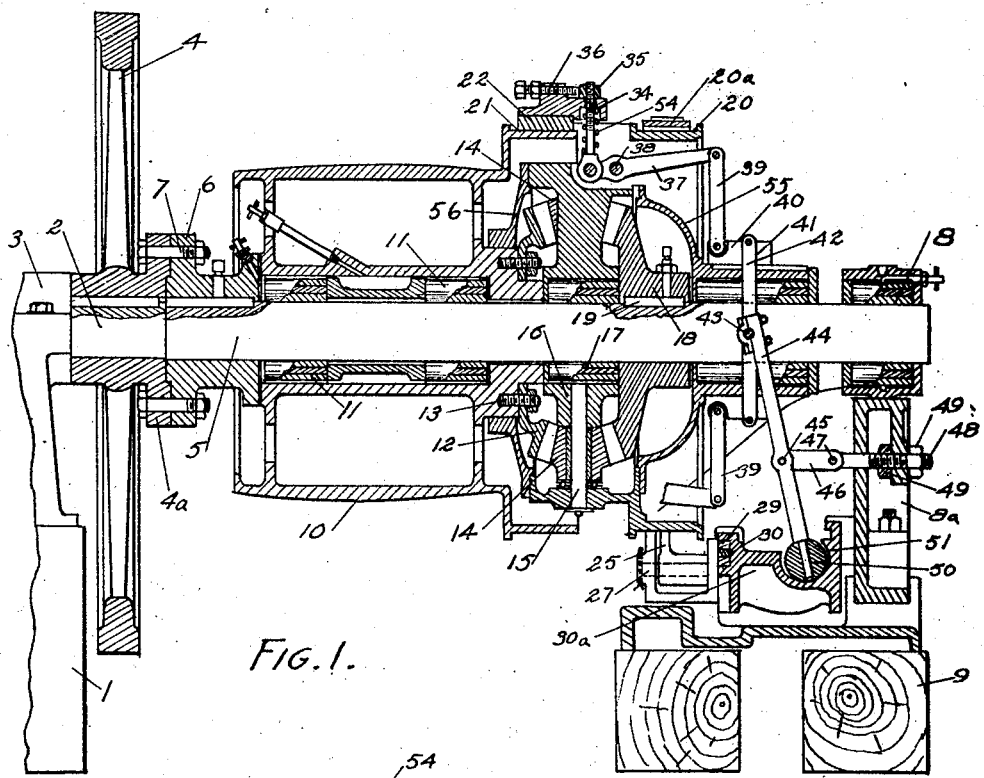

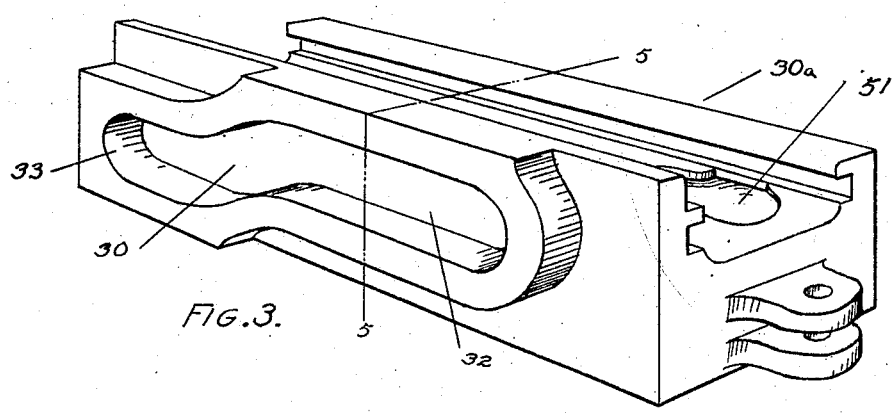
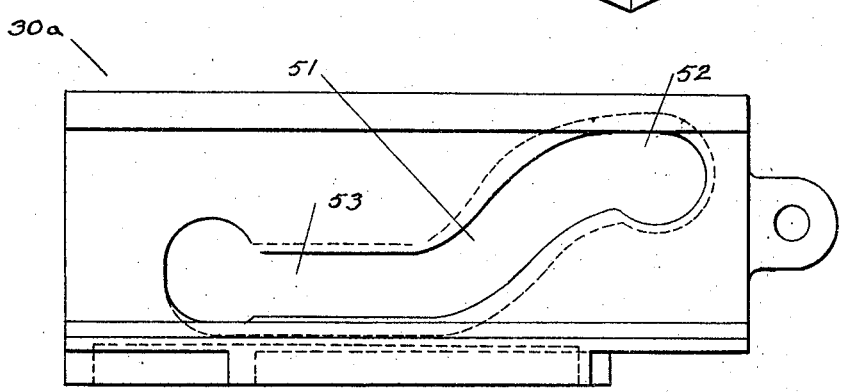
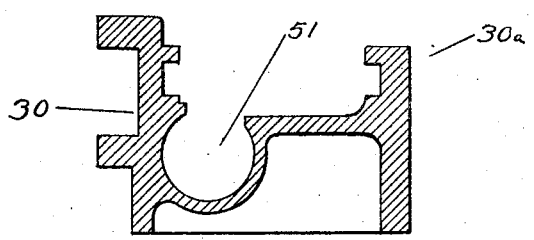

1,637,722

UNITED STATES PATENT OFFICE.

RAYMOND L. AUSTIN, OF BRADFORD, PENNSYLVANIA, ASSIGNOR TO BOVAIRD & SEYFANG MANUFACTURING COMPANY, OF BRADFORD, PENNSYLVANIA, A CORPORATION OF PENNSYLVANIA.

CONTROL MECHANISM.

Application filed January 12, 1925. Serial No. 1,800.

With many control mechanisms, such for instance as reversing clutches a convenient means for alternately operating the clutch and brake of such mechanism is desirable. The present invention is directed to a controlling mechanism of this type and a preferable embodiment of the invention as applied to a reversing clutch is illustrated in the accompanying drawings as follows:

Fig. 1 shows a central section through the clutch.

Fig. 2 an end elevation of the clutch.

Fig. 3 a perspective view of the cam block.

Fig. 4 a plan view of the same.

Fig. 5 a section on the line 5—5 in Fig. 3.

1 marks the engine bed, 2 the crank shaft, 3 the crank shaft bearing, and 4 the fly wheel on the engine. The hub of the fly wheel is provided with the out-board mounting flange 4ª and the clutch shaft 5 is arranged in the coupling flange 6 and clamped to the flange 4ª by bolts 7. The outer end of the clutch shaft is mounted in a bearing 8 carried by a post 8ª on the base 9. A driven pulley 10 is journaled on the shaft 5 by means of roller bearings 11. A gear 12 is secured to the pulley by means of studs 13. The gear 12 meshes with pinions 14 carried by the radially extending pins 15. The pins 15 are mounted in a spreader 16 and the spreader is journaled by means of a roller bearing 17 on the shaft 5. A gear 18 meshes with the pinion 14 opposite the gear 12. The gear 18 is fixed on the shaft 5 by means of a key 19.

A brake drum 20 is formed on the spreader and is operated upon by a brake band 20ª.

A clutch band 21 extends from the pulley 10. Brake shoes 22 operate on the band 21 and are carried by guides 23 extending from the spreader.

The ends of the brake band 20ª are secured to arms 34. These arms are mounted on shafts 27 and these shafts are fixed with levers 25 and 26. The levers swing on the shafts 27 and have their free ends locked together by gear segments 28. A roller 29 extends from the lever 25 into a cam groove 30, this cam groove having the raised portion 32 and the depressed portion 33, the raised portion releasing the brake and the depressed portion setting the brake. This cam groove is arranged in a cam block 30ª and this is actuated by a rod 31 running to a point, such as a drill, from which it is desired to control the clutch.

Pins 34 are secured to and adjusted relatively to the brake shoes by nuts 35. The nuts are locked in adjustment by screws 36. The pin 34 is pivotally connected with a lever 37. The lever is pivoted on a pin 38 mounted in the spreader. Links 39 extend from the outer ends of the levers 27 to a sliding collar 40. The collar has the usual groove 41 in which is arranged a ring 42. The ring has the trunnions 43 operating in a lever 44. The lever is fulcrumed at 45 on a link 46. The link is secured by a pin 47 on an adjusting bolt 48. The bolt is adjusted by nuts 49 arranged in the post 8ª. The lower end of the lever has the ball 50 which operates in a cam groove 51 in the block 30ª. The cam groove 51 has the set portion 52 and the release portion 53. These parts are opposed to the parts 32 and 33 of the cam groove 30 so that as the brake shoe is released the clutch is set, or as the clutch is set the brake shoe is released. The intermediate portion of these grooves releases both the brake shoes and the clutch.

It is preferable to provide a spring 54 on the pin 34, thus taking up the slack between the pin and brake shoe and assuring a release of the brake shoes even though set with a comparatively close adjustment.

Shells 55 and 56 are carried by the spreader and enclose the gears in a greasetight receptacle so that the gears may be lubricated by filling the case with grease.

In the operation of the clutch the cam block is moved either forward or back from a neutral position. In one position it sets the clutches and where this is done the clutch prevents relative movement between the spreader and the pulley 10 and the pinion 14 is locked against rotation by its engagement with the gear 12. Under these conditions the gear 18 is locked with the spreader by reason of its engagement with the pinions 14, these pinions being locked against rotation. Thus there is a direct drive from the clutch shaft to the pulley. When the brake band is set and the spreader is locked against rotation the gear 18 rotates the pinions 14 and the pinions in turn rotate the gear 12 and thus the pulley 10 in a reverse direction. It will be noted that both the brake band and the clutches are on the spreader and that these parts are in neutral position and that the spreader is stationary when the brake band is set. It is possible, therefore, to adjust the brake shoes without stopping the clutch shaft. The operating parts are at the outer end of the clutch shaft and can be readily removed by the removal of only the out-board bearing.

While the pulley 10 has been described as the driven element of the clutch it will be understood that the power may be delivered through the pulley 10 and the operation of the clutch reversed making the shaft 5 the driven element of the clutch rather than the driving element and in the claim these parts have been designated as the driven element and the driving element for convenience of description, it should be understood that these may be reversed without changing the substance of the invention.

What is claimed as new is:—

In a control mechanism, the combination of a clutch; a brake; and a cam mechanism comprising a cam setting the clutch and a cam actuating the brake, said cams being formed in a sliding block and adapted to actuate the clutch and brake alternately.

In testimony whereof I have hereunto set my hand.

RAYMOND L. AUSTIN.